April 3, 1962        E. A. MEYER        3,028,498

ELECTRICAL INTEGRATING DEVICE

Filed July 20, 1959

INVENTOR
EARL A. MEYER

BY

ATTORNEY

United States Patent Office 3,028,498
Patented Apr. 3, 1962

3,028,498
ELECTRICAL INTEGRATING DEVICE
Earl A. Meyer, Madison, Wis., assignor to Bjorksten Research Laboratories, Inc., Fitchburg, Wis., a corporation of Illinois
Filed July 20, 1959, Ser. No. 828,142
1 Claim. (Cl. 250—106)

This invention relates to a method and an instrument for measuring energy, and more particularly to a method comprising the steps of transducing energy from the form in which it occurs into electric current, actuating an electric meter with the current so produced, causing a radioactive component of the meter to be displaced and counting radioactive impulses which emanate from the displaced radioactive meter component with a radiation counting instrument. The counting instrument can be read to provide a measurement of the energy which would be expended in energizing the meter. The resulting energy reading represents an integrated value of power magnitudes multiplied by time retention of power incidence as a properly dimensioned energy measurement.

A quantitative study of noise as a factor which affects human enterprise necessitates using apparatus which can indicate instantaneous sound intensity and record incident sound energy in human environmental spaces. This invention provides a meter and a method which can be adapted for use to indicate instantaneous sound intensities and to register cumulative sound energies in human environs.

Accurate measurement of light radiation incident on biological life is necessary to an evaluation of biological growth factors in botanical and zoological studies. This invention provides a meter and a method which can be for use in measuring incident radiant energy in plant and animal environs.

Energy in any form such as electromagnetic, radioactive, acoustic, chemical, mechanical or other forms which can be transduced by conventional methods into electrical energy can be operably measured by the method of this invention.

It is an object of this invention to provide a method and a meter for measuring energy by integrating incident power magnitudes times time to yield an integrated energy value.

It is another object of this invention to provide a meter which can be used for recording acoustic energies.

It is another object of this invention to provide a meter which can be used for recording incident or induced electromagnetic energies.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

Figure 1:
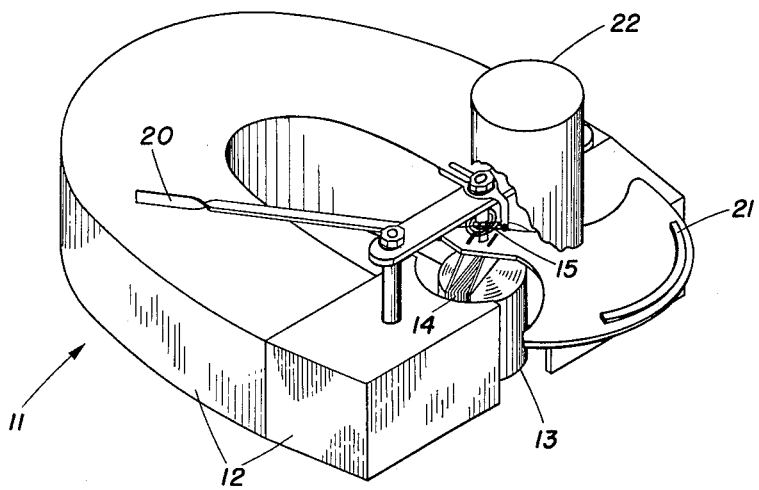
FIGURE 1 is a perspective view in cutaway of an electric current meter which is modified for use in the device of this invention.

In FIGURE 1 is shown a galvanometer 11 of conventional construction comprised of permanent magnet 12 and armature 13. Winding 14 on armature 13 serves to bias armature 13 within the magnetic field of magnets 12 when electric current is passed through windings 14 in accordance with the principles of electric and magnetic field phenomena. Coil spring 15 is tensioned to exert a torque on armature 13 which is opposite to that which might be produced by the operable flow of electric current through winding 14. Indicator 20 is supported on suitable bearings to enable it to freely rotate with armature 13 and to traverse a graduated scale on the meter, not shown in FIGURE 1, so as to enable an observer to operably read the instrument. Radioative material 21, shown disposed on the counterweighted end of indicator 20, may be of arcuately configured length and of substantially uniform width and be disposed in the proximity of radiation counter 22. Indicator 20 is in unactuated position, i.e. zero on the indicating scale when radioactive material 21 is positioned so as to be nonactuating to counter 22. As indicator 20 may be increasingly rotated by current actuation of the meter movement radioactive material 21 may be increasingly exposed to counter 22 through the unshielded lower end of counter 22. At full scale actuation the entire length of radioactive material 21 may be operably exposed to counter 22 and the maximum possible pulse counting rate may be effected that can be effected by use of the instrument of FIGURE 1. Intensity readings may be read directly from a suitably calibrated scale on the meter and energy readings may be read directly from a suitably calibrated scale on counter 22, the energy readings from counter 22 being related to the power readings from the meter as the time integral thereof. The meter may be calibrated to read either directly in electrical current or directly in electrical power or may be calibrated in accordance with a parameter of power measurement which might be associated with the type of energy being measured, such as decibels of acoustic energy or candle powers of light. The radiation counter may be calibrated directly in the energy units that may be associated with the measured energy or may be calibrated in roentgens of radioactive energy and then be correlated with the appropriate energy units for the variable being measured.

Figure 2:
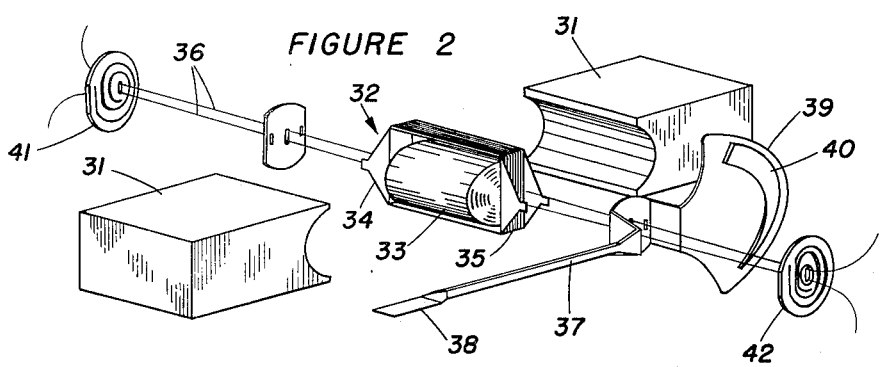
FIGURE 2 is a perspective view in separated relationship of another embodiment of the device of FIGURE 1.

In FIGURE 2 in exploded relation are shown components of a galvanometer movement of another conventional construction which is modified for use in the invention. Magnets 31 create a permanent magnetic field around armature 32. Windings 35, yoke 34, and core 33 comprise armature 32. Filaments 36 support armature 32 and in turn are operably tensioned and supported by coil springs 41 and 42. Indicator 37 is affixed to filaments 36 and is comprised of pointer 38, counter weight 39 and radioactive material 40. The movement illustrated in FIGURE 2 is enabled to operate in a manner which is essentially similar to the movement illustrated in FIGURE 1, but is of a higher sensitivity for use in spaces wherein energy may occur in short high intensity bursts and which may be inadequately recorded with instruments of lesser sensitivities.

Radioactive material 40 of FIGURE 2 may be arcuate in length and have an activity gradient which varies in linear proportion to the length. The exact proportion of activity gradient to length is not critical, the condition of linearity of the activity gradient to length function being the sole criterion of operable relationship. The dosage of radioactivity to which an adjacent counting device, such as counter 22 of FIGURE 1 is exposed by such an arrangement, is linearly directly proportional to incident energy, and may be calibrated to read directly in energy units. The energy value can be read directly from counter 22 either by utilizing a radioactive strip having uniform thickness and a width which varies as a linear function of length or by utilizing the fully equivalent constructions which have uniform width and length and a thickness or a concentration which vary linearly with length of the strip. Any of the arrangements present a radiation count which increases as the square of the length of the exposed strip of radioactive material.

The radioactive material preferably should have a nearly constant radiation value as measured by a half-life of at least several months so as to obviate the necessity of frequent recalibration of the radiation counter.

Figure 3:
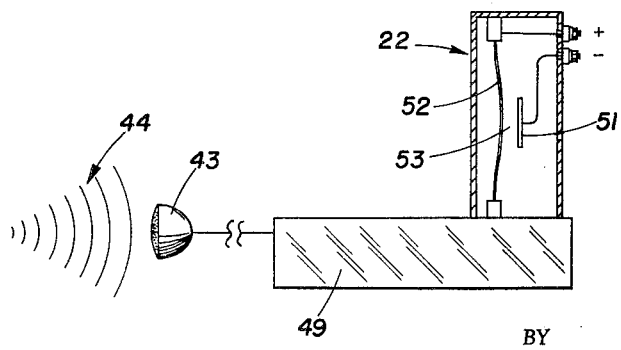
FIGURE 3 is a schematic view of the device of this invention.

In FIGURE 3 is shown in schematic arrangement this invention adapted for use in detecting and measuring acoustic energy. Transducer 43 may be disposed in an environment in which it is desired to measure instantaneous or total noise as represented by symbolic wave fronts 44. Transducer 43 may be any conventional microphone pick-up such as may be used in radio broadcasting. Electric circuitry might operably connect transducer 43 with a power source such as direct current source, or rectified alternating current source, but as illustrated in FIGURE 3 the apparatus is comprised with one electric wire and a common ground connection and is suitable for use with a sound energized transducer. Direct current may be supplied to meter 49 by means of transducer 43 without the use of a prime power source. However, supply current might be operably biased by a transducer supplied with direct or alternating current from a prime power source. The choice of the source of power is material only in relation to the construction of the movement of meter 49. The conventional galvanometer movements that are illustrated in FIGURES 1 and 2 may operably be used with either direct or rectified alternating current. A moving vane meter might be used with any power supply without requiring current rectification, but in all cases proper scale calibration must be provided.

Radiation counting meter 22 is shown schematically constructed as an electrometer and is comprised of charged plate 51 and quartz filament 52 separated by a gaseous dielectric 53. Ionization of gaseous dielectric 53 may be caused by charged particle emanations from radioactive material in meter 49. Charge leakage through dielectric 53 is enabled to occur in a degree which is proportional to the incidence of charged particles emanating from the radioactive material into counter 22. The relative proximity of position of flexible quartz filament 52 to charged plate 51 is proportional to the charge on the filament, the greater the charge on filament 52 and plate 51, the nearer will be the proximity of position between the two components. Visual self reading of the instrument may be made possible by providing a graduated scale adjacent to filament 52. A suitable radiation counting instrument may be obtained from Radiation Counter Laboratories, Skokie, Illinois.

Other conventional radiation detectors such as other electrometers or various color indicating radiation sensitive detectors may equally well be used. Neutron counters for use with neutron emitting radioactive sources may also be used. The radiation counter that is illustrated can only be used with charged particle emanations however.

The inventive method may readily be adapted for use with any electric meter which might have a suitable mechanical movement, and may be used to measure any type of energy which can be operably transduced into electric energy. Other energy sensitive devices which might be used in place of transducer 43 of FIGURE 3 are photo-electric cells for use with electromagnetic radiation, electrodes for use with an electro-chemical process, solenoids for use with a mechanical process or thermopiles for use with an infra red energy process.

The measurement that might be obtained from a suitable calibration of a radioactive counter scale may be other than that of energy. The time integral of current might be measured to give a reading of electrical charge by providing a strip of radioactive material which would be totally uniform in width, thickness and concentration along its length. Other configurations of the radioactive gradient along the length of a strip might be provided to yield integrated values of various exponential powers of electrical current times time of retention.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claim.

I claim:

A meter for measuring the product of the magnitude of applied energy and the length of time that said energy is applied, said meter comprising in combination an electric current meter, a radioactive material disposed on a movable component of said meter, a radiation counter operably disposed in said meter adjacent said movable component and substantially unshielded therefrom and exposable to said radioactive material through an ungraduated aperture, said radioactive material being disposed non-actuably to said counter when said movable component is unactuated and being traversable progressively into actuatable adjacency to said counter by movement of said movable component, said radioactive material being of uniformly varying activity for each increment of length thereof disposed on said movable component, said activity being a mathematical function of the length of said material.

References Cited in the file of this patent

UNITED STATES PATENTS

| | | |
|---|---|---|
| 1,605,295 | Schrader | Nov. 2, 1926 |
| 2,399,061 | Rosenblum | Apr. 23, 1946 |
| 2,809,306 | Coleman | Oct. 8, 1957 |
| 2,858,449 | Burr | Oct. 28, 1958 |
| 2,871,366 | Hill | Jan. 27, 1959 |
| 2,872,586 | Papanek | Feb. 3, 1959 |
| 2,913,900 | Andrews | Nov. 24, 1959 |